United States Patent
Okuyama et al.

(10) Patent No.: US 10,919,208 B2
(45) Date of Patent: Feb. 16, 2021

(54) LIQUID BLOW MOLDING METHOD AND LIQUID BLOW MOLDING APPARATUS

(71) Applicants: Yuichi Okuyama, Tokyo (JP); Mitsuru Shiokawa, Tokyo (JP)

(72) Inventors: Yuichi Okuyama, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 275 days.

(21) Appl. No.: 15/766,240

(22) PCT Filed: Oct. 17, 2016

(86) PCT No.: PCT/JP2016/080734
§ 371 (c)(1),
(2) Date: Apr. 5, 2018

(87) PCT Pub. No.: WO2017/090339
PCT Pub. Date: Jun. 1, 2017

(65) Prior Publication Data
US 2018/0290366 A1    Oct. 11, 2018

(30) Foreign Application Priority Data

Nov. 27, 2015    (JP) ................................. 2015-232349

(51) Int. Cl.
*B29C 49/46*    (2006.01)
*B65D 1/00*    (2006.01)
(Continued)

(52) U.S. Cl.
CPC .............. *B29C 49/46* (2013.01); *B65B 3/022* (2013.01); *B65D 1/00* (2013.01); *B65D 1/0261* (2013.01);
(Continued)

(58) Field of Classification Search
None
See application file for complete search history.

(56) References Cited

U.S. PATENT DOCUMENTS 6,514,451 B1    2/2003   Boyd et al.
2009/0283494 A1*  11/2009  Maxwell .............. B65D 1/0246
                                                           215/329
(Continued)

FOREIGN PATENT DOCUMENTS

CN    104159722 A    11/2014
EP    2 860 015 A1    4/2015
(Continued)

OTHER PUBLICATIONS

Aug. 1, 2019 Office Action issued in Chinese Patent Application No. 201680060487.X.
(Continued)

*Primary Examiner* — Monica A Huson
(74) *Attorney, Agent, or Firm* — Oliff PLC (57) ABSTRACT

A bottomed tubular-shaped preform is molded into a liquid-containing container holding a content liquid, by supplying, through a first supply path, a first liquid at a predetermined pressure into the preform that has been heated to a predetermined temperature to liquid blow mold the preform and by supplying, through a second supply path that is different from the first supply path, a second liquid into the preform after or simultaneously with the supply of the first liquid.

5 Claims, 10 Drawing Sheets

(51) Int. Cl.
  *B65B 3/02*   (2006.01)
  *B65D 1/02*   (2006.01)
  *B29C 49/42*   (2006.01)
  *B29K 23/00*   (2006.01)
  *B29C 49/58*   (2006.01)
  *B29K 67/00*   (2006.01)
  *B29C 49/12*   (2006.01)
  *B29C 49/28*   (2006.01)
  *B29C 49/66*   (2006.01)
  *B29D 22/00*   (2006.01)
  *B29L 31/00*   (2006.01)

(52) U.S. Cl.
  CPC .............. *B29C 49/12* (2013.01); *B29C 49/28* (2013.01); *B29C 49/4289* (2013.01); *B29C 49/66* (2013.01); *B29C 2049/4655* (2013.01); *B29C 2049/4658* (2013.01); *B29C 2049/4664* (2013.01); *B29C 2049/5841* (2013.01); *B29D 22/003* (2013.01); *B29K 2023/12* (2013.01); *B29K 2067/003* (2013.01); *B29L 2031/7158* (2013.01)

(56) References Cited

U.S. PATENT DOCUMENTS

2012/0315348 A1  12/2012  Wilson et al.
2015/0231812 A1  8/2015  Klatt et al.

FOREIGN PATENT DOCUMENTS

| | | | |
|---|---|---|---|
| JP | 2013-154617 | A | 8/2013 |
| JP | 2013-208834 | A | 10/2013 |
| JP | 2015-066921 | A | 4/2015 |
| JP | 2015-139988 | A | 8/2015 |
| JP | 2015-160432 | A | 9/2015 |
| WO | 2014/209346 | A1 | 12/2014 |
| WO | 2014/209356 | A1 | 12/2014 |

OTHER PUBLICATIONS

May 29, 2018 International Preliminary Report on Patentability issued in International Patent Application No. PCT/JP2016/080734.
Dec. 20, 2016 International Search Report issued in International Patent Application No. PCT/JP2016/080734.
Jul. 23, 2019 Office Action issued in Japanese Patent Application No. 2015-232349.
May 9, 2019 Extended Search Report issued in European Patent Application No. 16868288.8.
Nov. 12, 2020 Office Action issued in European Patent Application No. 16868288.8.
Nov. 10, 2020 Office Action issued in Japanese Patent Application No. 2020-066096.

\* cited by examiner

LIQUID BLOW MOLDING METHOD AND LIQUID BLOW MOLDING APPARATUS

TECHNICAL FIELD

The present disclosure relates to a liquid blow molding method and a liquid blow molding apparatus that are used to mold a bottomed tubular-shaped preform into a liquid-containing container in which a content liquid is held. The present disclosure especially relates to a liquid blow molding method and a liquid blow molding apparatus that are used to mold a liquid-containing container in which a mixed liquid of a first liquid and a second liquid is held as the content liquid.

BACKGROUND

Resin-made containers, typical examples of which are polypropylene (PP) bottles and polyethylene terephthalate (PET) bottles, are used to hold a variety of liquids, such as a beverage, a cosmetic product, a pharmaceutical product, a detergent, and a toiletry including shampoo, as the content liquids. Such a container is generally produced by blow molding a preform that has been formed by a thermoplastic resin material as mentioned above in a bottomed tubular shape.

As an example of blow molding used to mold a preform into a container, liquid blow molding is known. In liquid blow molding, a pressurized liquid is used as a pressurizing medium supplied into the preform.

Patent Literature 1, for example, describes a liquid blow molding method for molding a preform into a container having a predetermined shape conforming to a cavity of a mold used for blow molding by placing, in the mold, the preform heated in advance to a temperature at which stretchability is achieved and by supplying, into the preform, a liquid pressurized to a predetermined pressure through a nozzle. According to the liquid blow molding method, since the content liquid, such as a beverage, to be held in the container as a final product may be used as the liquid supplied into the preform, the liquid-containing container in which the content liquid is held is molded easily by molding the container simultaneously with filling the content liquid into the container, and the process of filling the content liquid to the container after molding may be omitted. Accordingly, the production process and the configuration of production line (apparatus) may be simplified.

CITATION LIST

Patent Literature

PTL1: JP2013208834A

SUMMARY

Technical Problem

However, regarding, for example, a container configured to hold a liquid, such as a seasoning dressing in which one liquid mainly composed of oil and another liquid mainly composed of water are mixed, that is difficult to be maintained in a uniform mixed state, there is a problem that the aforementioned conventional liquid blow molding method is difficult to adopt. The reason is that it is difficult for the aforementioned conventional liquid blow molding method to supply the liquid into the preform through the nozzle while maintaining the liquid in the uniform mixed state.

The present disclosure has been conceived in view of the above problem, and the present disclosure is to provide a liquid blow molding method and a liquid blow molding apparatus both of which may be adopted to mold a liquid-containing container holding a content liquid including two types of liquids that is difficult to be maintained in the uniform mixed state.

Solution to Problem

One of aspects of the present disclosure resides in a liquid blow molding method for molding a bottomed tubular-shaped preform into a liquid-containing container in which a content liquid is held. The liquid blow molding method includes: a first supply step of supplying, through a first supply path, a first liquid at a predetermined pressure into the preform that has been heated to a predetermined temperature to liquid blow mold the preform; and a second supply step of supplying, through a second supply path that is different from the first supply path, a second liquid into the preform after or simultaneously with the supply of the first liquid.

In a preferred embodiment of the liquid blow molding method according to the present disclosure, the liquid blow molding method further includes a suck-back step, performed after the preform is liquid blow molded into the container having a predetermined shape in the first supply step, of sucking out a predetermined amount of the first liquid from the container that has been molded in the predetermined shape in the first supply step, wherein, in the second supply step, the second liquid is supplied into the container from which the predetermined amount of the first liquid has been sucked out in the suck-back step.

In another preferred embodiment of the liquid blow molding method according to the present disclosure, in the second supply step, the supply of the second liquid is stopped before an internal pressure in the container reaches atmospheric pressure.

In yet another preferred embodiment of the liquid blow molding method according to the present disclosure, the liquid blow molding method further includes a circulation step, performed before the first supply step, of circulating the first liquid between a tank configured to hold the first liquid and the first supply path.

Another aspect of the present disclosure resides in a liquid blow molding apparatus configured to mold a bottomed tubular-shaped preform into a liquid-containing container in which a content liquid is held. The liquid blow molding apparatus includes: a mold in which the preform that has been heated to a predetermined temperature is to be fitted; a blow nozzle configured to engage with a mouth of the preform fitted in the mold; a first supply path configured to be connected to the blow nozzle to supply the first liquid to the blow nozzle; a sealing body configured to be arranged inside the first supply path in a manner such that the sealing body is displaceable in upward and downward directions to open and close the blow nozzle; a second supply path configured to be disposed in the sealing body in a manner such that the second supply path opens to a lower end surface of the sealing body to supply a second liquid to the blow nozzle; and a seal pin configured to be disposed inside the second supply path to open and close the second supply path, wherein the first liquid is supplied at a predetermined pressure into the preform through the first supply path to liquid blow mold the preform, and the second liquid is supplied into the preform through the second supply path after or simultaneously with the supply of the first liquid.

In a preferred embodiment of the liquid blow molding apparatus according to the present disclosure, a stretching rod is fitted to an axis of the sealing body in a manner such that the stretching rod is displaceable in upward and downward directions relative to the sealing body, and the second supply path is disposed on an axis of the stretching rod along an axis direction of the stretching rod.

Advantageous Effect

The present disclosure provides a liquid blow molding method and a liquid blow molding apparatus both of which may be adopted to mold a liquid-containing container holding a content liquid including two types of liquids that is difficult to be maintained in the uniform mixed state.

DETAILED DESCRIPTION

The present disclosure will be described in more detail below by illustration with reference to the drawings.

A liquid blow molding method according to the present disclosure is used to mold a bottomed tubular-shaped preform into a liquid-containing container in which a content liquid is held. The liquid blow molding method includes: a first supply step of supplying, through a first supply path, a first liquid at a predetermined pressure into the preform that has been heated to a predetermined temperature to liquid blow mold the preform; and a second supply step of supplying, through a second supply path that is different from the first supply path, a second liquid into the preform after or simultaneously with the supply of the first liquid. That is to say, the presently disclosed liquid blow molding method may be called a production method of the liquid-containing container holding the content liquid in which the first liquid and the second liquid are mixed. The presently disclosed liquid blow molding method may be implemented with use of a liquid blow molding apparatus 1 with a configuration for example of FIG. 1.

Figure 1:
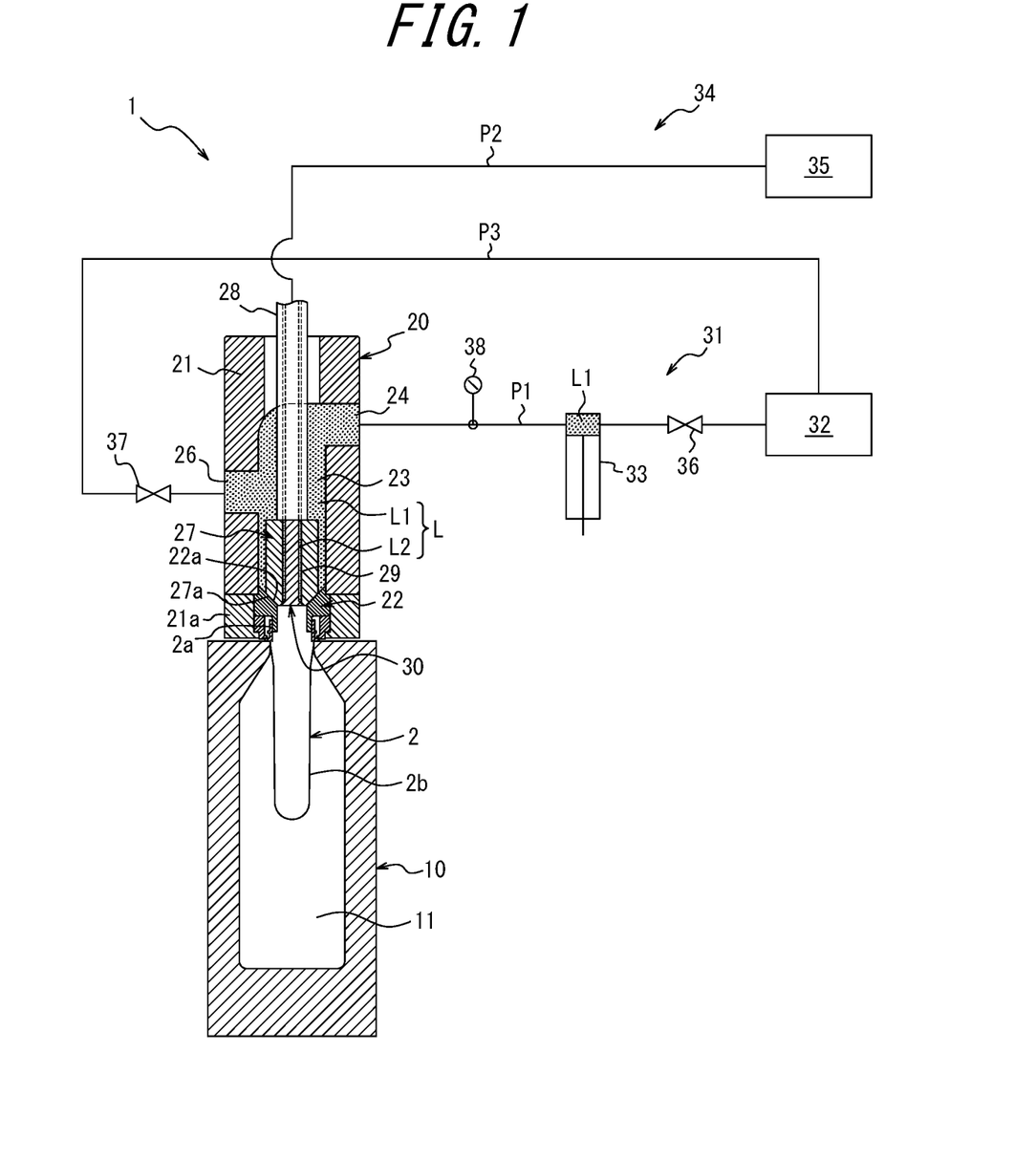
FIG. 1 illustrates a blow molding apparatus according to one of embodiments of the present disclosure.

As illustrated in FIG. 1, the liquid blow molding apparatus 1 according to one of embodiments of the present disclosure is configured to liquid blow mold a preform 2 into the liquid-containing container holding therein the content liquid. Liquid blow molding refers to blow molding using a pressurized liquid as a pressurizing medium (pressurizing liquid) supplied to the preform 2, instead of pressurized air that is used in air blow molding.

A mixed liquid of the first liquid L1 and the second liquid L2 may be used as the liquid L supplied to the preform 2, namely, the content liquid L to be held in the liquid-containing container after molding. Examples of the mixed liquid may include a seasoning dressing in which the first liquid L1 mainly composed of oil and the second liquid L2 mainly composed of water and having properties to be easily separated from the first liquid L1 are mixed. Although such a liquid L is difficult to be maintained in a uniform mixed state, the liquid L may be used to mold the preform 2 into the liquid-containing container according to the presently disclosed liquid blow molding method and liquid blow molding apparatus.

Additionally, the liquid (content liquid) L is not limited to the seasoning dressing, and any of a variety of liquids, such as a cosmetic product and a beverage, that are difficult to be maintained in the uniform mixed states may be used as the liquid L.

As the preform 2, a preform may be used that has been formed by a thermoplastic resin material, such as polypropylene (PP) and polyethylene terephthalate (PET), in a bottomed tubular shape having a cylindrical-shaped mouth 2a as an opening end and a cylindrical-shaped trunk 2b, which is connected to the mouth 2a and which has a lower end that is closed. Note that in the drawings the trunk 2b is depicted while omitting the thickness for convenience.

The preform 2 does not necessarily have the aforementioned shape and may have a variety of bottomed tubular shapes depending on the shape of the container after molding.

Although not illustrated in detail, the mouth 2a is provided, on an outer wall surface thereof, with an engagement projection to attach a closing cap (which is not illustrated) to the mouth 2a of the liquid-containing container after molding by plugging (undercut engagement). Additionally, a male screw, instead of the engagement projection, may also be provided on the outer wall surface of the mouth 2a, and the closing cap may be attached to the mouth 2a by screw connection.

The liquid blow molding apparatus 1 includes a mold 10 used for blow molding. The mold 10 has a cavity 11, which has a shape corresponding to the final shape, such as a bottle shape, of the container. The cavity 11 is open upward on an upper surface of the mold 10. The preform 2 is fitted in the mold 10, with the trunk 2b being arranged within the cavity 11 of the mold 10 and with the mouth 2a protruding upward from the mold 10.

Although not illustrated in detail, the mold 10 may be opened into left and right mold halves, and the liquid-containing container may be removed from the mold 10 by opening the mold 10 into the left and right halves after the preform 2 is molded into the liquid-containing container.

Above the mold 10, there is disposed a nozzle unit 20, which serves as a nozzle to supply the liquid into the preform 2. The nozzle unit 20 includes a main body block 21, which is displaceable in upward and downward directions relative to the mold 10. The main body block 21 is provided, in a lower end thereof, with a support block 21a, and a blow nozzle 22 is supported by the support block 21a to be attached to the lower end of the main body block 21. The blow nozzle 22 is formed in a substantially cylindrical shape and configured to engage, from above, with the mouth 2a of the preform 2 fitted in the mold 10 when the main body block 21 is displaced downward to the lowermost stroke end. The blow nozzle 22 is provided, on an upper surface thereof, with a sealing surface 22a, which has a conical surface shape tapered with a diameter decreasing downward.

The main body block 21 is provided, inside thereof, with a first supply path 23, which extends vertically. The first supply path 23 is a flow path used to supply the first liquid L1 to the blow nozzle 22, and the first supply path 23 in a lower end thereof communicates with the blow nozzle 22. The main body block 21 is further provided with a supply port 24, which communicates with an upper and of the first supply path 23, and a circulation port 26, which communicates with a middle portion of the first supply path 23.

Inside the first supply path 23, there is arranged a sealing body 27, which is configured to open and close the blow nozzle 22. The sealing body 27 is fixed to a lower end of a shaft body 28, which is disposed in the nozzle unit 20 in a manner such that the shaft body 28 is displaceable in the upward and downward directions. Thus, the sealing body 27 is displaceable in the upward and downward directions inside the first supply path 23. The sealing body 27 is formed in a cylindrical shape and provided, in an outer peripheral portion of a lower end surface thereof, with a tapered abutment surface 27a. The abutment surface 27a has the same inclination angle as that of the sealing surface 22a of the blow nozzle 22, so that the abutment surface 27a may closely contact the sealing surface 22a when the sealing body 27 is displaced to a closed position, that is, a lowermost stroke end position. Accordingly, when the sealing body 27 reaches the closed position, the blow nozzle 22 is closed by the sealing body 27, and the communication between the blow nozzle 22 and the first supply path 23 is blocked. On the other hand, when the sealing body 27 is displaced upward from the closed position, the blow nozzle 22 is opened to communicate with the first supply path 23.

The shaft body 28 is formed hollow and provided, on an axis thereof, with a second supply path 29, which extends along the axis direction. The second supply path 29 is a flow path used to supply the second liquid L2 to the blow nozzle 22. The second supply path 29 passes through an axis of the sealing body 27 and opens to the lower end surface of the sealing body 27 on the inner side of the abutment surface 27a. In this way, the second supply path 29 may communicate with the blow nozzle 22 even when the sealing body 27 is in the closed position.

Figure 2:
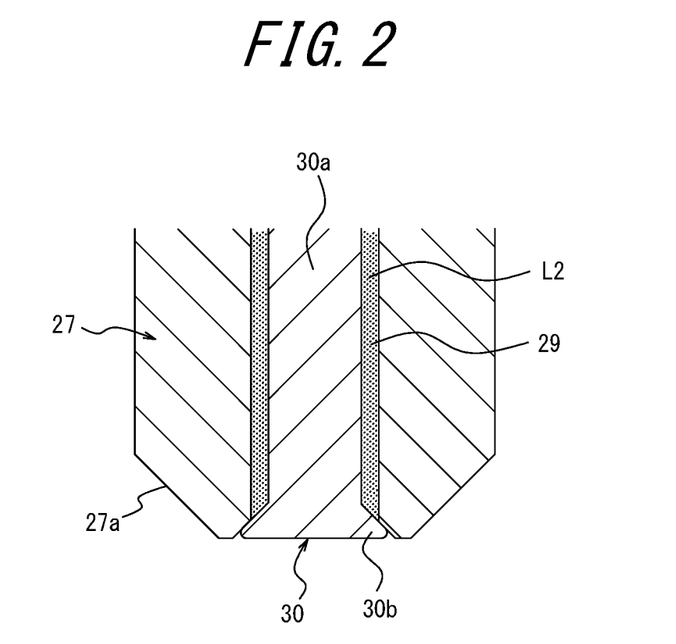
FIG. 2 is a sectional view illustrating a configuration of a seal pin of FIG. 1.

To open and close an opening of the second supply path 29, a seal pin 30 is arranged inside the second supply path 29, that is, on the axis of the shaft body 28. As illustrated in FIG. 2, the seal pin 30 includes a shaft portion 30a, whose diameter is smaller than an inner diameter of the second supply path 29, and a sealing portion 30b, which is disposed integrally in a lower end of the shaft portion 30a and whose diameter is larger than the inner diameter of the second supply path 29. The seal pin 30 is arranged in a manner such that the seal pin 30 is displaceable upward and downward inside the second supply path 29. In a normal state, the seal pin 30 is configured to close the second supply path 29, with an upward-extending reverse tapered sealing surface disposed in the sealing portion 30b abutting against a downward-extending reverse tapered surface disposed on the lower end of the shaft body 28. On the other hand, the opening of the second supply path 29 may be opened to the blow nozzle 22 by displacing the seal pin 30 downward.

As illustrated in FIG. 1, a first liquid supply unit 31 is connected to the supply port 24 through a first pipe P1. The first liquid supply unit 31 includes a first tank 32 and a first pressurizing source 33, which is connected to the downstream side of the first tank 32. The first tank 32 may be configured to hold the first liquid L1 and to heat the first liquid L1 to a predetermined temperature and keep the first liquid L1 at the predetermined temperature. The first pressurizing source 33 is configured to draw the first liquid L1 held in the first tank 32 and to pressurize the drawn first liquid L1 to a predetermined pressure and supply the pressurized first liquid L1 to the first supply path 23 through the supply port 24.

In the illustrated example, the first pressurizing source 33 is configured by a plunger pump. Additionally, the first pressurizing source 33 is not limited to the plunger pump and may be configured by a differently configured pressurizing source that is capable of pressurizing the first liquid L1 held in the first tank 32 to the predetermined pressure and supplying the pressurized first liquid L1 to the first supply path 23.

A second liquid supply unit 34 is connected to the second supply path 29 through a second pipe P2 above the shaft body 28. The second liquid supply unit 34 includes a second tank 35 configured to hold the second liquid L2, and the second liquid L2 may be supplied from the second tank 35 to the second supply path 29 through the second pipe P2.

Although in the illustrated example the second liquid supply unit 34 is configured by the second tank 35, the second liquid supply unit 34 may also include a pressurizing source, such as a plunger pump, and be configured to forcibly supply the second liquid L2 held in the second tank 35 to the second supply path 29.

The circulation port 26 is connected to the first tank 32 through a circulation pipe P3, so that the first liquid L1 supplied from the first pressurizing source 33 to the first supply path 23 may be returned to the first tank 32 through the circulation pipe P3. The first tank 32 has a circulation function that allows the first liquid L1 to be circulated between the first tank 32 and the first supply path 23, that is, between the first tank 32 and the nozzle unit 20, without being retained inside the first supply path 23 in a standby state where liquid blow molding is not performed.

A first opening-closing valve 36 is disposed between the first tank 32 and the first pressurizing source 33, and a circulation control opening-closing valve 37 is disposed between the circulation port 26 and the first tank 32. These opening-closing valves 36 and 37 are each configured by an electromagnetic valve and each operates to open and close to switch the corresponding pipe P1 or P3 between a closed state and an opened state. Furthermore, the opening-closing valves 36 and 37 are controlled to open and close at predetermined timings by a control unit or the like which is not illustrated.

A pressure gauge 38 is further disposed in the first pipe P1, and data measured by the pressure gauge 38 is inputted to the control unit which is not illustrated.

The control unit which is not illustrated is also connected, for example, to the first liquid supply unit 31 and a driving unit of the seal pin 30, and the operation of the liquid blow molding apparatus 1 is integratedly controlled by the control unit.

Next, a description is given of a method (i.e., liquid blow molding method according to the present disclosure) for molding the preform 2 into the liquid-containing container in which the content liquid is held inside the container having a predetermined shape by using the liquid blow molding apparatus 1 with the above configuration.

Firstly, the preform 2 that has been heated in advance to the predetermined temperature (e.g., from 80° C. to 150° C.) around which stretchability is achieved by using a heating unit (which is not illustrated) such as a heater is fitted in the mold 10 used for blow molding, and the mold 10 is closed. Then, the nozzle unit 20 is displaced downward to engage the blow nozzle 22 to the mouth 2a of the preform 2.

Figure 3:
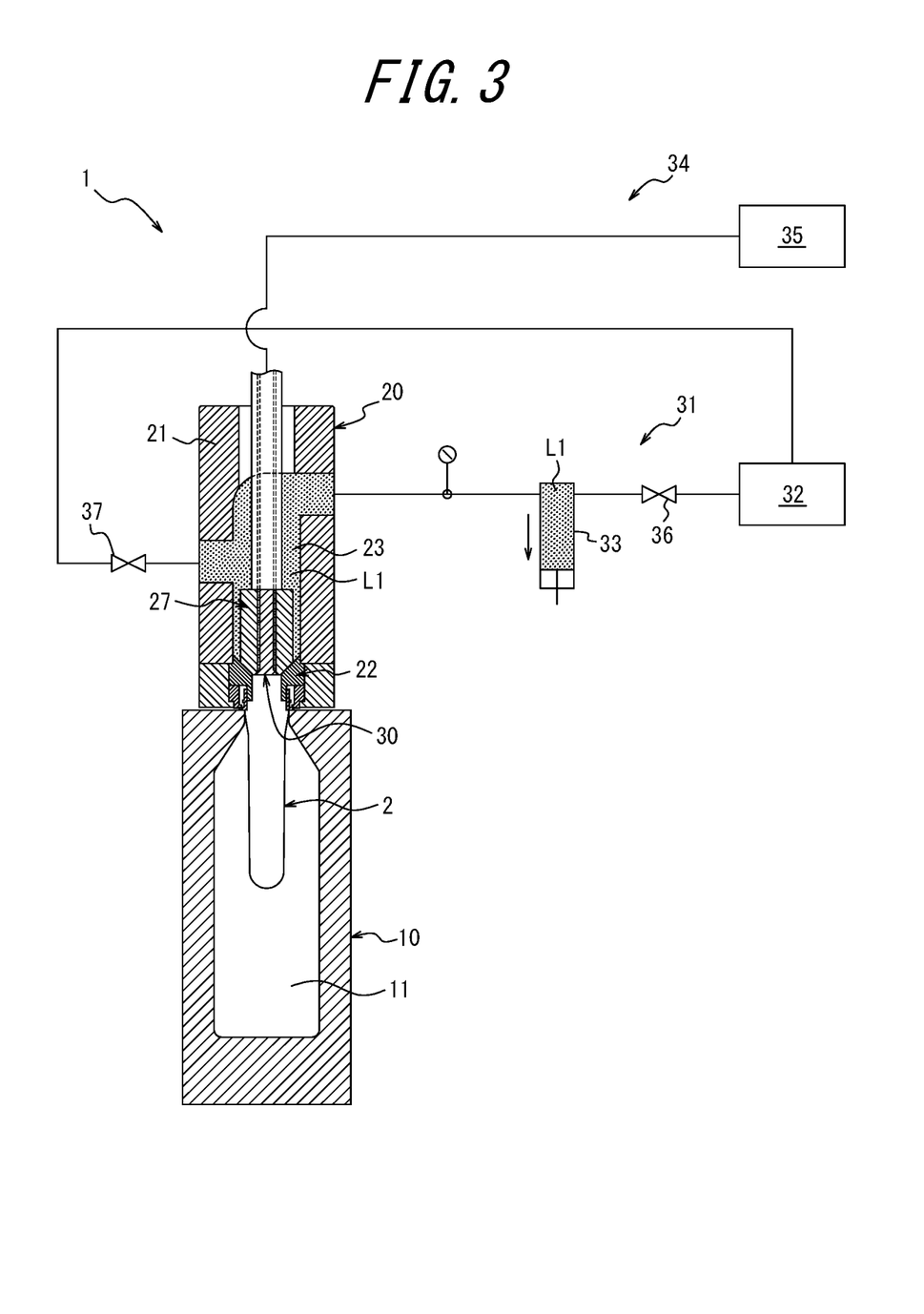
FIG. 3 illustrates the liquid blow molding apparatus in a standby state.

Subsequently, as illustrated in FIG. 3, the first opening-closing valve 36 is opened, and the first pressurizing source 33 is subject to pull operation, while the sealing body 27 and the seal pin 30 remain closed. By doing so, the first liquid L1 held in the first tank 32 is drawn by the first pressurizing source 33 to be filled in the first pressurizing source 33. In this state, the liquid blow molding apparatus 1 is kept in the standby state until liquid blow molding is performed.

The presently disclosed liquid blow molding method may include a circulation step performed in the aforementioned standby state. That is to say, by opening the circulation control opening-closing valve 37 in the standby state, the first liquid L1 may be circulated between the first tank 32 and the nozzle unit 20 due to the circulation function of the first tank 32. This allows the temperature of the first liquid L1 in the first supply path 23 to be maintained at the predetermined temperature suitable for liquid blow molding by letting the first tank 32 always circulate the first liquid L1 regulated at the predetermined temperature through the first supply path 23 without retaining the first liquid L1 inside the first supply path 23 in the standby state before liquid blow molding is performed.

Subsequently, liquid blow molding is performed. In the presently disclosed liquid blow molding method, liquid blow molding is performed in two steps, namely, the first supply step and the second supply step.

Figure 4:
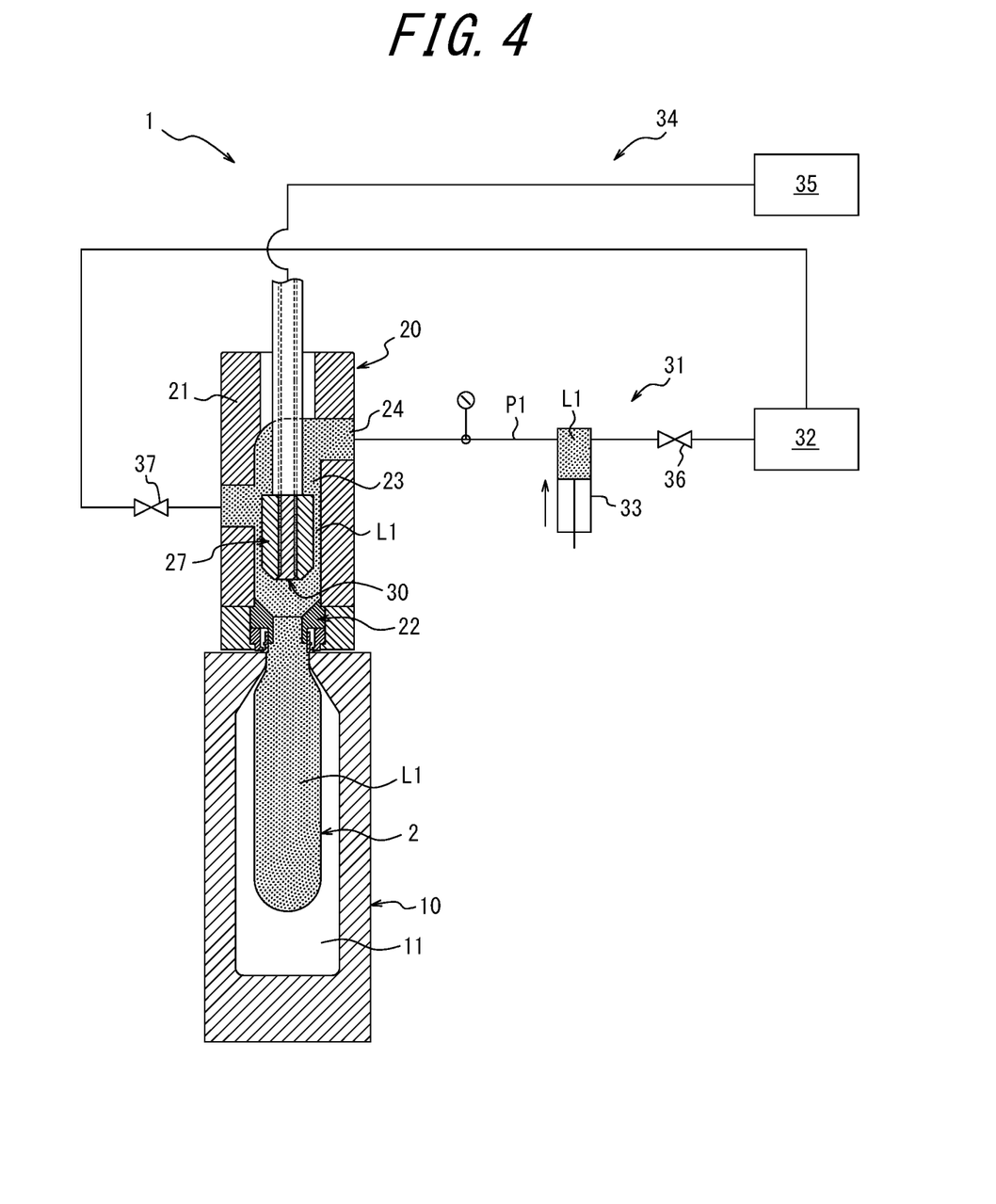
FIG. 4 illustrates the liquid blow molding apparatus in a state where a first supply step is performed.
Figure 5:
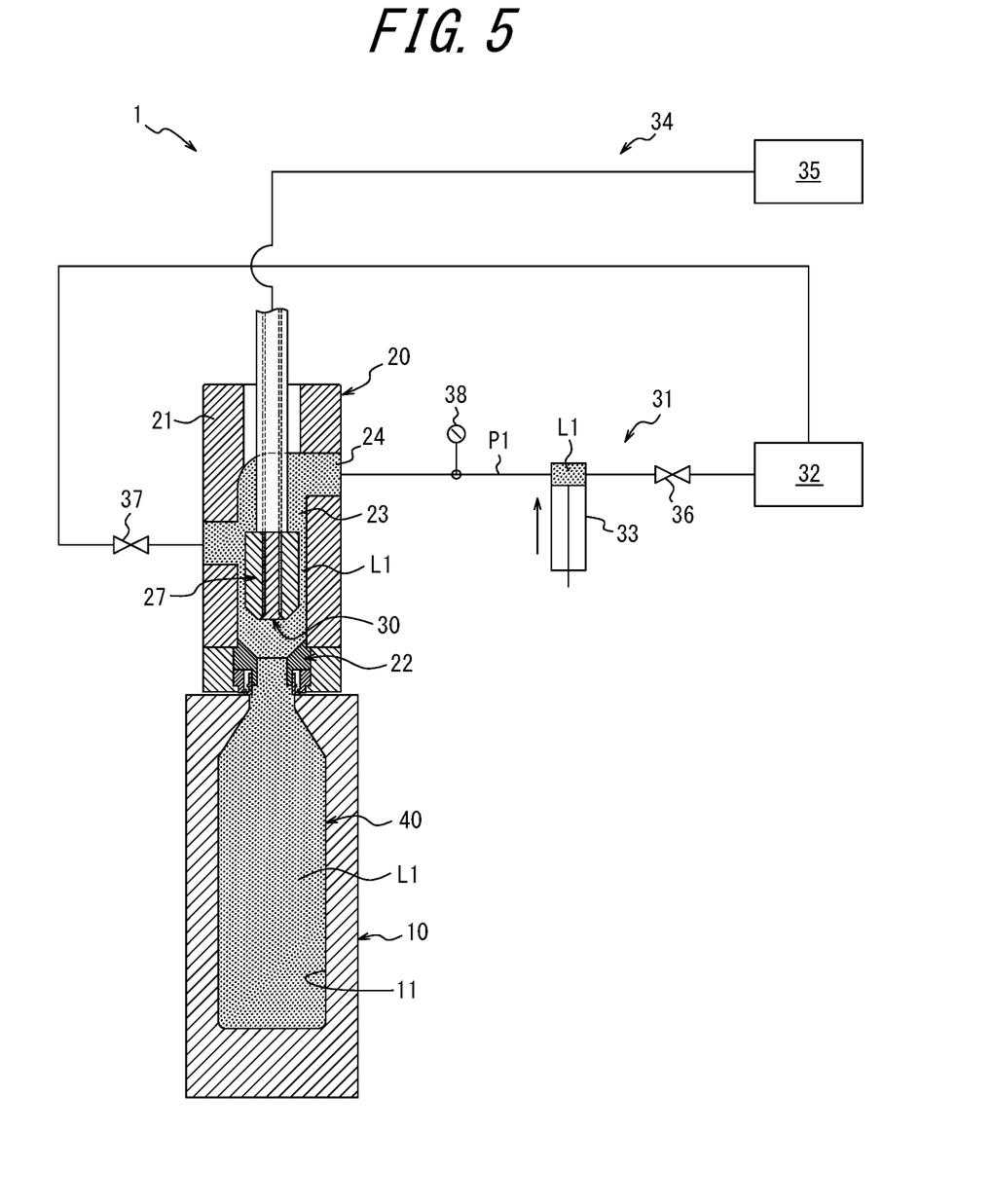
FIG. 5 illustrates the liquid blow molding apparatus in a state where the first supply step is completed.

As illustrated in FIG. 4, in the first supply step, the first pressurizing source 33 is operated in a state where the first opening-closing valve 36 and the circulation control opening-closing valve 37 are closed and where the sealing body 27 is opened. At this time, the seal pin 30 remains closed. Consequently, the preform 2 is liquid blow molded by supplying only the first liquid L1 at the predetermined temperature that is pressurized to the predetermined pressure higher than that inside the preform 2 into the preform 2 from the first pressurizing source 33 through the first pipe P1, the supply port 24, the first supply path 23, and the blow nozzle 22. As illustrated in FIG. 5, in the present embodiment, the preform 2 is liquid blow molded into a container 40 having the predetermined shape conforming to the cavity 11 in the first supply step. Additionally, a pressure PR1 of the first liquid L1 measured by the pressure gauge 38 is higher than a pressure PR3 inside the preform 2 which is being liquid blow molded.

Figure 6:
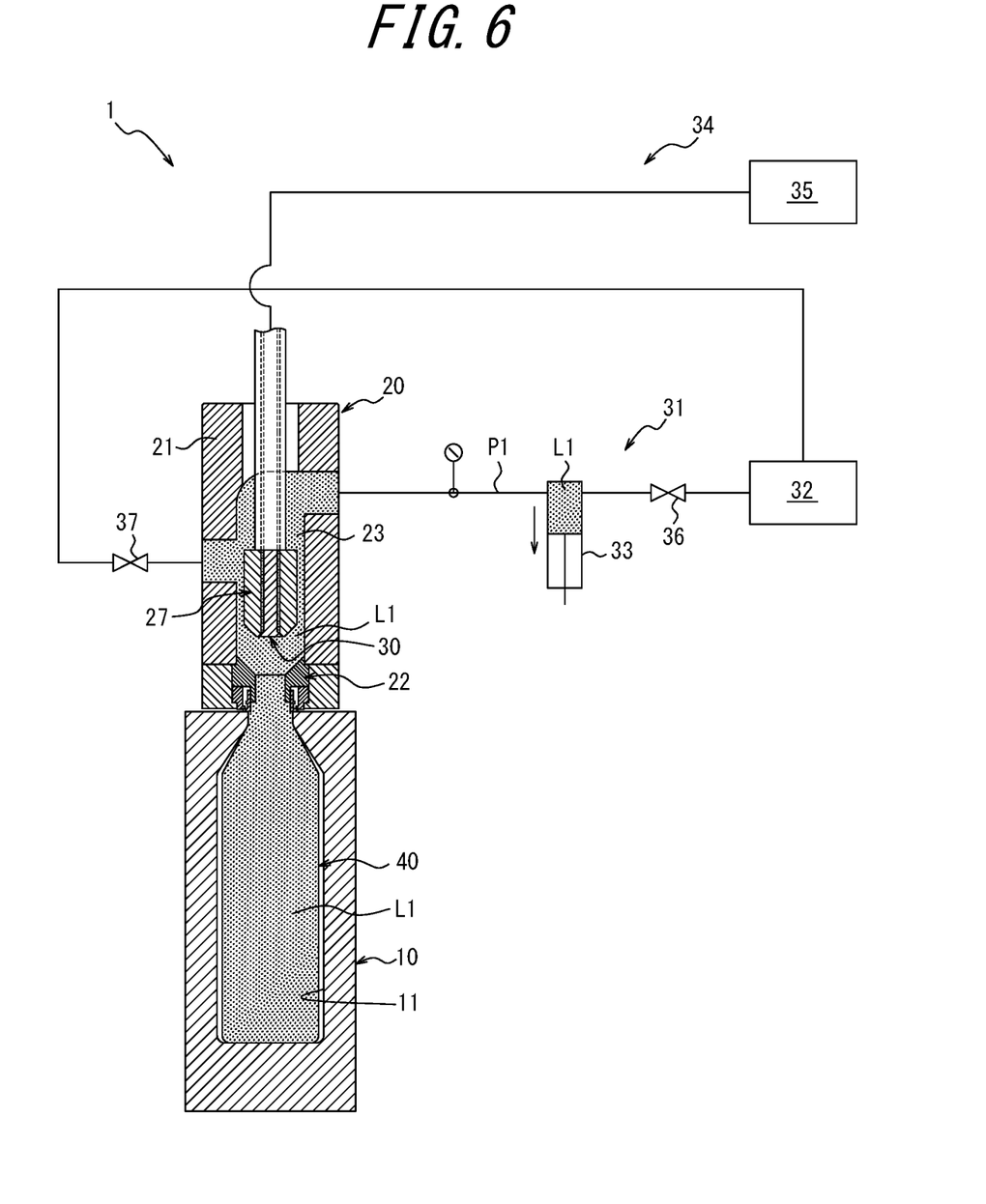
FIG. 6 illustrates the liquid blow molding apparatus in a state where a suck-back step is performed.

The presently disclosed liquid blow molding method may include a suck-back step performed after the first supply step in which the preform 2 is liquid blow molded into the container 40 having the predetermined shape. As illustrated in FIG. 6, in the suck-back step, the first pressurizing source 33 is operated in a reverse direction to the first supply step in the state where the first opening-closing valve 36 and the circulation control opening-closing valve 37 remain closed and where the sealing body 27 remains opened. Consequently, a predetermined amount of the first liquid L1 is sucked out (sucked back) toward the first supply path 23 from the inside of the container 40 that has been formed in the predetermined shape in the first supply step.

Figure 7:
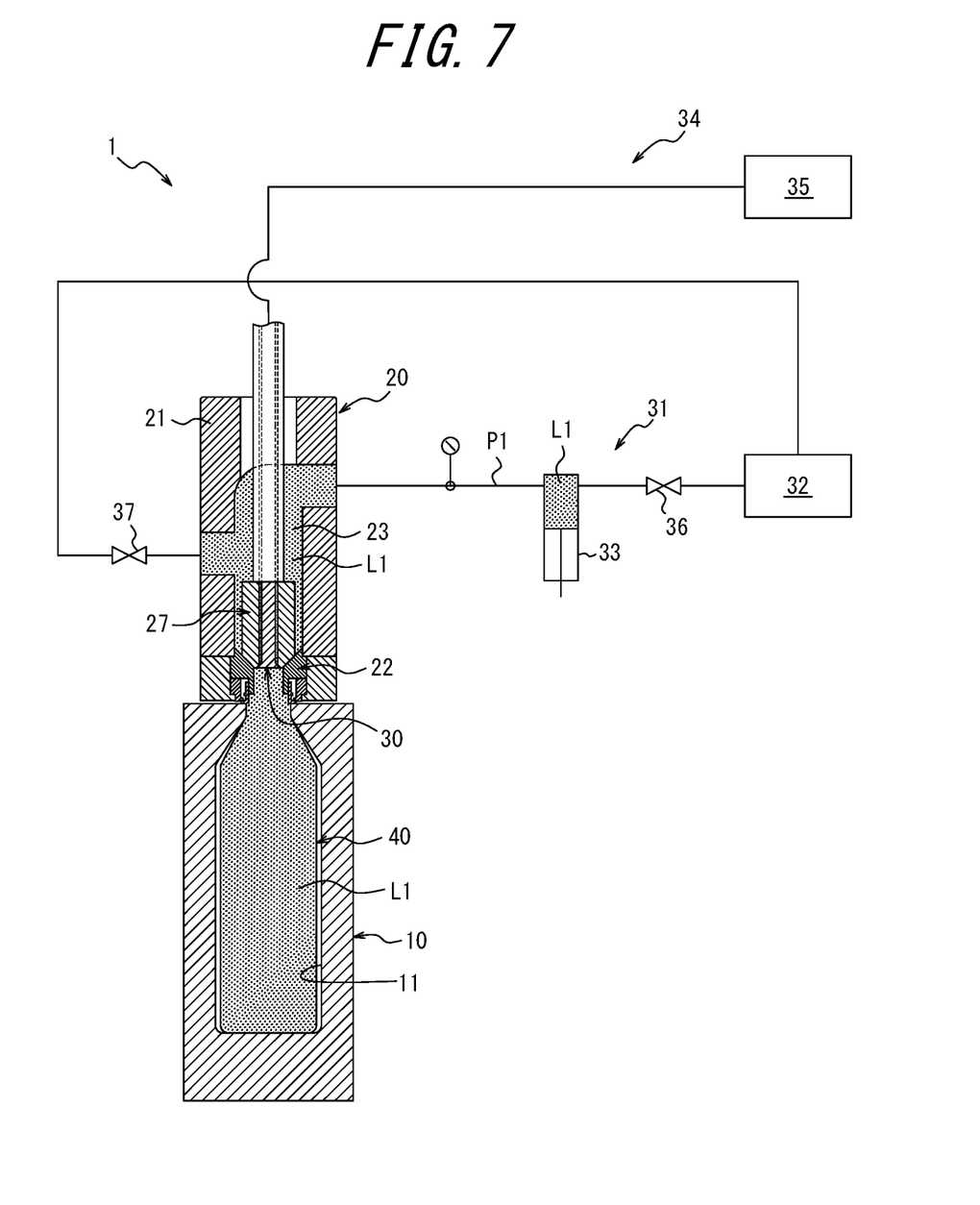
FIG. 7 illustrates the liquid blow molding apparatus in a state where the suck-back step is completed.

After the predetermined amount of the first liquid L1 has been sucked out, the sealing body 27 is closed as illustrated in FIG. 7. When the sealing body 27 is closed, the volume of the container 40 is decreased due to the sucked-out predetermined amount of the first liquid L1, and the container 40 is maintained in a contracted and deformed state in which a gap is generated between the container 40 and the cavity 11, with the inside of the container 40 being placed in a negative pressure state lower than atmospheric pressure.

Figure 8:
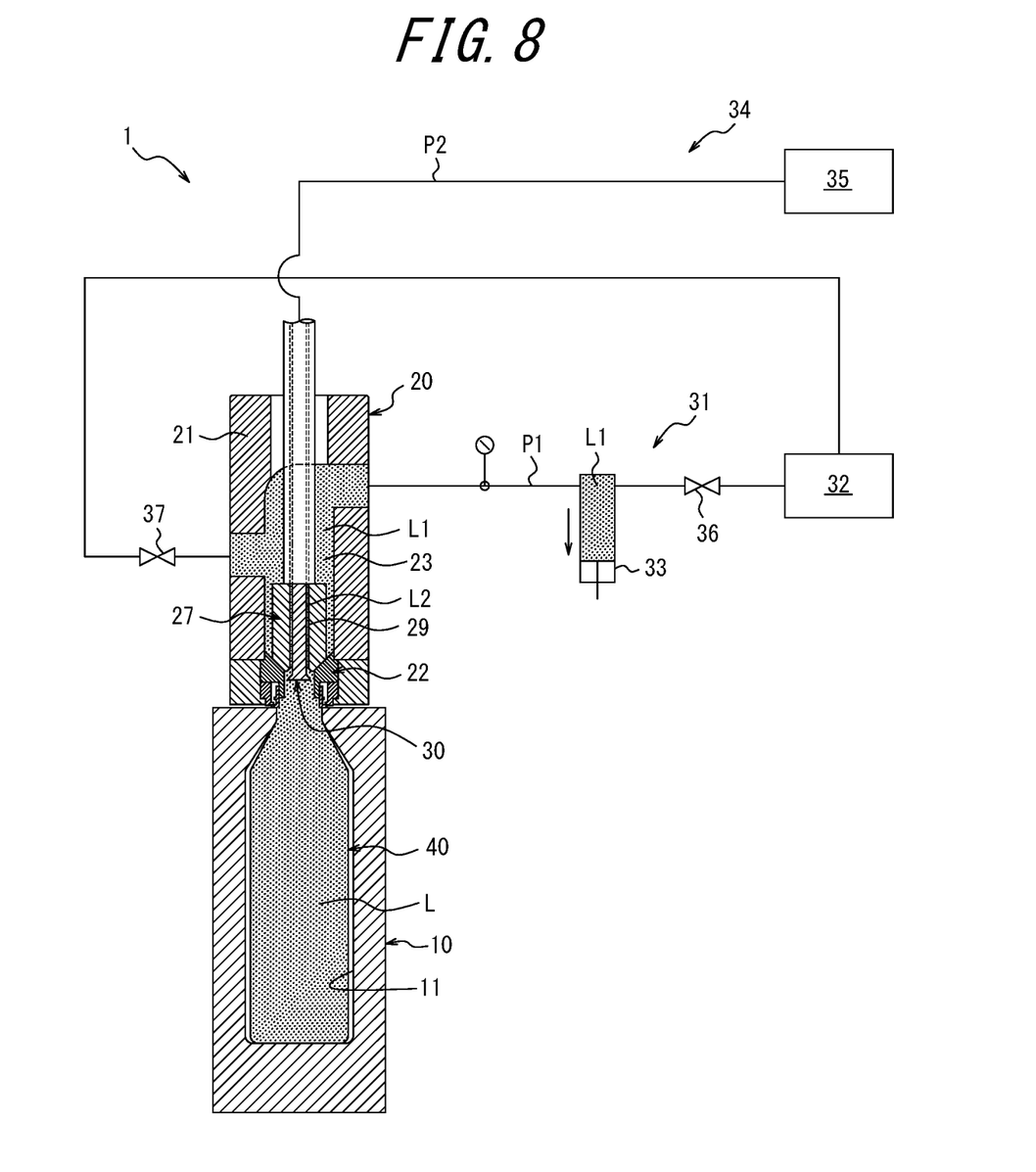
FIG. 8 illustrates the liquid blow molding apparatus in a state where a second supply step is performed.

After the suck-back step is completed, the second supply step is performed next. As illustrated in FIG. 8, in the second supply step, the seal pin 30 is opened in the state where the sealing body 27 remains closed. The seal pin 30 may be configured to be opened automatically by being displaced downward in response to release of upward urging force applied by an urging unit or by the negative pressure inside the container 40 or may be configured to be opened forcibly by a driving source such as an electric motor.

When the seal pin 30 is opened in the state where the sealing body 27 remains closed, the second supply path 29 is brought into communication with the inside of the container 40, and the second liquid L2 inside the second supply path 29 is drawn into the container 40 due to the negative pressure inside the container 40. Consequently, a predetermined amount of the second liquid L2 is supplied through the second supply path 29 into the container 40 from which the predetermined amount of the first liquid L1 has been sucked out in the suck-back step. Due to the predetermined amount of the second liquid L2 supplied into the container 40, the content liquid L, in which the first liquid L1 and the second liquid L2 are mixed at a predetermined ratio, is held inside the container 40. At this time, a pressurizing source may be disposed in the second pipe P2, and the second liquid L2 pressurized by the pressurizing source may be supplied into the container 40.

Figure 9:
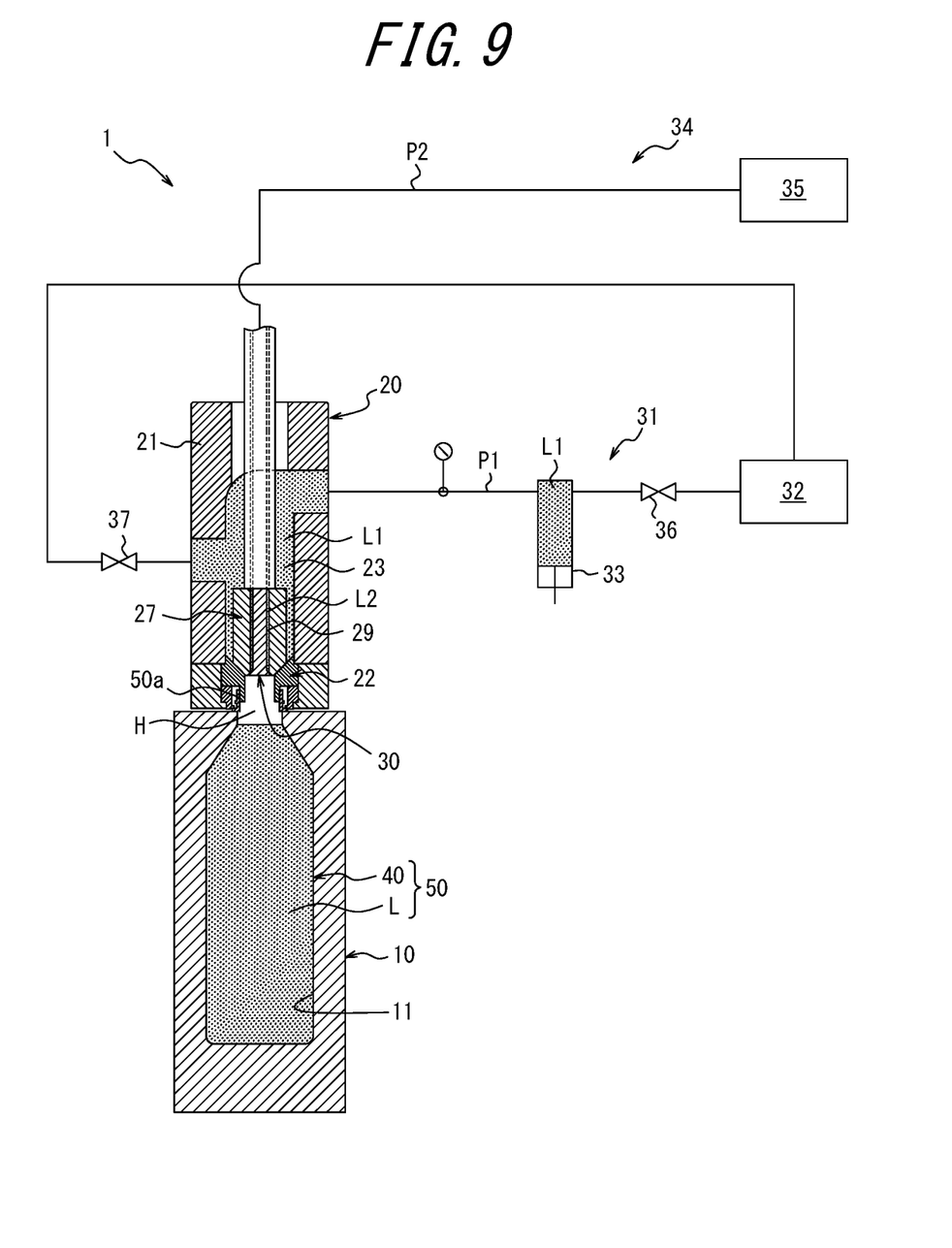
FIG. 9 illustrates the liquid blow molding apparatus in a state where liquid blow molding is completed.

After the predetermined amount of the second liquid L2 is supplied into the container 40 in the second supply step, the seal pin 30 is closed, and liquid blow molding is completed as illustrated in FIG. 9. Consequently, a liquid-containing container 50, in which a predetermined amount of the content liquid L is held in the container 40, is completed.

In the second supply step, it is preferable to stop the supply of the second liquid L2 by closing the seal pin 30 before a pressure, i.e., an internal pressure, inside the container 40 reaches atmospheric pressure. That is to say, it is preferable to stop the supply of the second liquid L2 by closing the seal pin 30 before the container 40 which has been contracted and deformed due to the first liquid L1 sucked-out in the suck-back step completely returns to the original shape conforming to an inner surface of the cavity 11. As a result, by exposing a mouth 50a of the liquid-containing container 50 to atmosphere after the seal pin 30 is closed, a liquid level of the content liquid L to be held in the liquid-containing container 50, that is, the volume of the content liquid L to be held in the liquid-containing container 50, may be regulated appropriately to create a predetermined head space H inside the liquid-containing container 50.

Although not illustrated in detail, after the liquid-containing container 50 is completed, a cap is attached to the mouth 50a of the liquid-containing container 50, and subsequently, the mold 10 is opened to remove the completed liquid-containing container 50 from the mold 10. The cap may also be attached after the liquid-containing container 50 is removed from the mold 10.

Additionally, after the suck-back step is completed and the sealing body 27 is closed, as illustrated in FIGS. 8 and 9, the first liquid supply unit 31 opens the first opening-closing valve 36 and the circulation control opening-closing valve 37 and continues to operate the first pressurizing source 33 to thereby fill the first liquid L1 to the first pressurizing source 33. This is the standby state ready for the next liquid blow molding.

In this way, the presently disclosed liquid blow molding method performs liquid blow molding by supplying the first liquid L1 and the second liquid L2 into the preform 2 through the separate supply paths 23 and 29. Accordingly, even when the liquid L, such as a seasoning dressing in which the first liquid L1 mainly composed of oil and the second liquid L2 mainly composed of water and having properties to be easily separated from the first liquid L1 are mixed, in which the first liquid L1 and the second liquid L2 are difficult to be maintained in the mixed state is used as the content liquid L, the predetermined amount of the first liquid L1 and the predetermined amount of the second liquid L2 are supplied to the preform 2 or the container 40 through the separate supply paths 23 and 29 at the predetermined ratio. The presently disclosed liquid blow molding method therefore allows easy production of the liquid-containing container 50 holding the content liquid L in which the first liquid L1 and the second liquid L2 are mixed at the predetermined ratio by liquid blow molding.

Furthermore, in a case where only the first liquid L1 is supplied to the preform 2 for liquid blow molding in the first supply step, where the predetermined amount of the first liquid L1 is sucked out from the container after molding in the subsequent suck-back step, and where the predetermined amount of the second liquid L2 is supplied into the container 40 with increased storage space in the subsequent second supply step as in the present embodiment, the preform 2 that has been heated to the predetermined temperature may be cooled by liquid blow molding the preform 2 by using only the first liquid L before supplying the second liquid L2 to the cooled preform 2 or container 40. That is to say, in a case of supplying the first liquid L1 to the preform 2 and subsequently supplying the second liquid L2 to the preform 2 or in a case of supplying the first liquid L1 to the preform 2 and starting to supply the second liquid L2, together with the first liquid L1, in the middle of the supply of the first liquid L1 in liquid blow molding, the preform 2 is cooled to a temperature cool enough not to affect a heat-susceptible ingredient, and subsequently, the second liquid L2 is supplied to the cooled preform 2 or container 40. Accordingly, even when liquid blow molding is adopted to mold the liquid-containing container 50 holding, as the content liquid L, the mixture of the first liquid L1 that does not contain an ingredient susceptible to degradation such as thermal denaturation and deactivation (i.e., that is heat-resistant) and the second liquid L2 that contains an ingredient susceptible to deterioration such as thermal denaturation and deactivation (i.e., that is heat-sensitive), the deterioration of the ingredient contained in the second liquid L2 due to heating by heat of the preform 2 is prevented, and the quality of the content liquid L held in the liquid-containing container 50 after molding is ensured. In this way, the presently disclosed liquid blow molding method and liquid blow molding apparatus 1 allow easy production of the liquid-containing container 50 holding, as the content liquid L, the liquid in which the heat-resistant first liquid L1 and the heat-sensitive second liquid L2 are mixed without degrading the quality of the content liquid L.

An enzyme liquid detergent may for example be used as the liquid L in which the heat-resistant first liquid L1 and the heat-sensitive second liquid L2 are mixed. In this case, the first liquid L1 is a liquid not containing an enzyme, and the second liquid L2 is another liquid containing an enzyme. Additionally, the first liquid L1 and the second liquid L2 may be mainly composed of a common liquid ingredient or different liquid ingredients. Of course, a variety of liquids other than the aforementioned enzyme liquid detergent may be used as the mixed liquid of the heat-resistant first liquid L1 and the heat-sensitive second liquid L2.

Moreover, since the presently disclosed liquid blow molding method supplies the first liquid L1 and the second liquid L2 into the preform 2 divisionally through different systems, the second liquid L2 is prevented from adhering or remaining in the first supply path 23, through which the first liquid L1 is supplied to the preform 2, during liquid blow molding of the preform 2. Accordingly, the predetermined mixture ratio becomes easier to maintain.

Figures 10A, 10B:
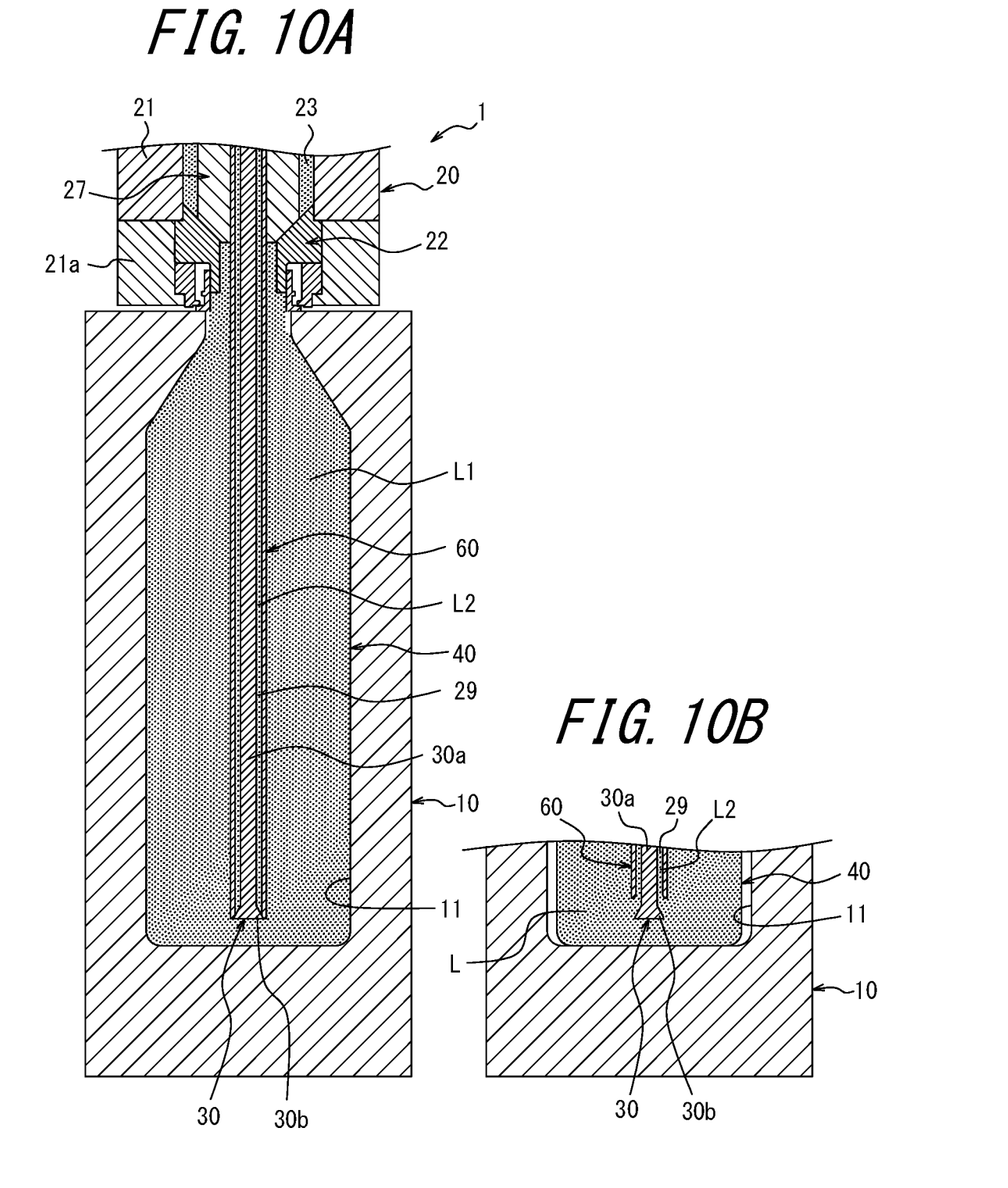
FIG. 10A is a sectional view illustrating a modification of the liquid blow molding apparatus of FIG. 1.
FIG. 10B is a sectional view illustrating a state where a seal pin is opened in the modification of FIG. 10A.

FIG. 10A is a sectional view illustrating a modification of the liquid blow molding apparatus of FIG. 1, and FIG. 10B is a sectional view illustrating a state where a seal pin is opened in the modification of FIG. 10A. In FIGS. 10A and 10B, members described above are denoted by the same reference numerals.

As illustrated as the modification in FIGS. 10A and 10B, the liquid blow molding apparatus 1 may include a stretching rod 60. In this case, biaxial stretch blow molding may be performed in the first supply step. In biaxial stretch blow molding, the preform 2 is stretched in the axis direction (longitudinal direction) by the stretching rod 60 while being stretched in the radial direction by the pressurized first liquid L1.

In the present modification, the stretching rod 60 is formed hollow and fitted to the axis of the sealing body 27 in a manner such that the stretching rod 60 is displaceable in the upward and downward directions. The second supply path 29 is provided on an axis of the stretching rod 60 along the axis direction. The second supply path 29 opens in a lower end of the stretching rod 60. The seal pin 30 is disposed on the axis of the stretching rod 60 and configured to close the second supply path 29, with the upward-extending reverse tapered sealing surface disposed in the sealing portion 30b abutting against a downward-extending reverse tapered surface disposed on the lower end of the stretching rod 60. Although not illustrated, the shaft body 28 is fixed to the upper end side of the sealing body 27, and the stretching rod 60 is supported inside the shaft body 28 in a manner such that the stretching rod 60 is relatively displaceable in the upward and downward directions.

After stretching the preform 2 in the longitudinal direction, the stretching rod 60 is stopped at a position higher than a bottom of the container 40 after molding by a predetermined height as illustrated in FIG. 10A. Then, as illustrated in FIG. 10B, the second liquid L2 may be supplied into the container 40 by opening the seal pin 30 after the suck-back step is performed. In this case, by withdrawing the stretching rod 60 out of the content liquid L after supplying the second liquid L2 into the container 40, the head space corresponding to the volume of the withdrawn stretching rod 60 is created, and the liquid level of the content liquid L, that is, the volume of the content liquid L, to be held in the completed liquid-containing container 50 may be regulated appropriately. Accordingly, in the second supply step, the second liquid L2 may be supplied until the pressure inside the container 40 reaches atmospheric pressure without having to close the seal pin 30 before the pressure inside the container 40 reaches atmospheric pressure. This facilitates control of the second supply step.

In the case where the stretching rod 60 is included, the predetermined head space may also be created inside the container 40 simply by withdrawing the stretching rod 60 out of the container 40 without having to perform the suck-back step after the first supply step in which the preform 2 is molded into the container 40 having the predetermined shape. In this case, by supplying the second liquid L2 into the container 40 in an amount less than the volume of the head space in the second supply step after withdrawing the stretching rod 60 out of the container 40, the content liquid L in which the first liquid L1 and the second liquid L2 are mixed at the predetermined ratio may be held in the liquid-containing container 50, and the level of the content liquid L, that is, the volume of the content liquid L, to be held in the liquid-containing container 50 may be regulated appropriately.

Needless to say, the present disclosure is not limited to the above embodiment, and various changes may be made without departing the gist of the present disclosure.

For example, although the above embodiment describes the case where the presently disclosed liquid blow molding method is performed by using the liquid blow molding apparatus 1 with the configuration of FIG. 1, the presently disclosed liquid blow molding method may be performed by using a differently configured liquid blow molding apparatus or the like.

Furthermore, although in the above embodiment the suck-back step and the circulation step are performed in addition to the first supply step and the second supply step, the suck-back step and the circulation step may be omitted.

Moreover, although in the above embodiment the second liquid L2 is supplied to the preform 2 or the container 40 after the supply of the first liquid L1 is completed in the first supply step, the second liquid L2 may be supplied to the preform 2, together with the first liquid L1, to liquid blow mold the preform 2. In this case, the supply of the second liquid L2 may be started simultaneously with starting the supply of the first liquid L1, or the supply of the second liquid L2 may be started after starting the supply of the first liquid L1 or in the middle of the supply of the first liquid L1.

REFERENCE SIGNS LIST

1 Liquid blow molding apparatus
2 Preform
2a Mouth
2b Trunk
10 Mold
11 Cavity
20 Nozzle unit
21 Main body block
21a Support block
22 Blow nozzle
22a Sealing surface
23 First supply path
24 Supply port
26 Circulation port
27 Sealing body
27a Abutment surface
28 Shaft body
29 Second supply path
30 Seal pin
31 First liquid supply unit
32 First tank
33 First pressurizing source
34 Second liquid supply unit
35 Second tank
36 First opening-closing valve
37 Circulation control opening-closing valve
38 Pressure gauge
40 Container
50 Liquid-containing container
50a Mouth
L Liquid (content liquid)
L1 First liquid
L2 Second liquid
P1 First pipe
P2 Second pipe
P3 Circulation pipe
H Head space

The invention claimed is:

1. A liquid blow molding method for molding a bottomed tubular-shaped preform into a liquid-containing container in which a content liquid is held, the liquid blow molding method comprising:
a first supply step of supplying, through a first supply path, a first liquid at a predetermined pressure into the preform that has been heated to a predetermined temperature to liquid blow mold the preform;
a second supply step of supplying, through a second supply path that is different from the first supply path, a second liquid into the preform after or simultaneously with the supply of the first liquid, wherein:
the second liquid includes properties that prevent the first liquid and the second liquid from maintaining a uniform mixed state;
a suck-back step, performed after the preform is liquid blow molded into the container having a predetermined shape in the first supply step, of sucking out a predetermined amount of the first liquid from the container that has been molded in the predetermined shape in the first supply step; and
in the second supply step, the second liquid is supplied into the container from which the predetermined amount of the first liquid has been sucked out in the suck-back step.

2. The liquid blow molding method of claim 1, wherein, in the second supply step, the supply of the second liquid is stopped before an internal pressure in the container reaches atmospheric pressure.

3. The liquid blow molding method of claim 1, further comprising a circulation step, performed before the first supply step, of circulating the first liquid between a tank configured to hold the first liquid and the first supply path.

4. The liquid blow molding method of claim 2, further comprising a circulation step, performed before the first supply step, of circulating the first liquid between a tank configured to hold the first liquid and the first supply path.

5. A liquid blow molding method for molding a bottomed tubular-shaped preform into a liquid-containing container in which a content liquid is held, the liquid blow molding method comprising:
a first supply step of supplying, through a first supply path, a first liquid at a predetermined pressure into the preform that has been heated to a predetermined temperature to liquid blow mold the preform;
a second supply step of supplying, through a second supply path that is different from the first supply path, a second liquid into the preform after or simultaneously with the supply of the first liquid, wherein:
the second liquid includes properties that prevent the first liquid and the second liquid from maintaining a uniform mixed; and a circulation step, performed before the first supply step, of circulating the first liquid between a tank configured to hold the first liquid and the first supply path.

\* \* \* \* \*